Fig. 5.

INVENTORS.
LEE WILSON
JOHN ARNOLD
ATTORNEYS.

Fig. 7.

INVENTORS.
LEE WILSON
JOHN ARNOLD
BY Bosworth, Sessions,
Herrstrom & Knowles
ATTORNEYS.

United States Patent Office 3,370,839
Patented Feb. 27, 1968

3,370,839
COIL ANNEALING APPARATUS
Lee Wilson and John Arnold, Rocky River, Ohio, assignors to Lee Wilson Engineering Company, Inc., Cleveland, Ohio, a corporation of Ohio
Filed June 15, 1965, Ser. No. 464,113
11 Claims. (Cl. 266—5)

ABSTRACT OF THE DISCLOSURE

Apparatus for the annealing or other heat treatment of metal articles, particularly coils of strip metal, in which furnaces are positioned in a row along a trackway on one or both sides thereof and a charging car is supported for travel on the trackway and adapted selectively to be positioned at each furnace for charging or unloading thereof. Storage platforms are located at the ends of the row of furnaces and the charging car includes a rotatable turntable structure whereby furnaces on either side of the tracks may be serviced by the car.

---

This invention relates to the annealing or other heat treatment of coils of strip metal and more particularly to methods and apparatus which are especially adapted to automated or programmed operation of a coil annealing line.

Coils of strip metal, in either tight wound or open form, are commonly annealed, or otherwise subjected to treatment requiring heating of the coils, by supporting the coils in a furnace chamber and repeatedly circulating around or through the coil heated atmosphere of the proper and desired composition. It will be understood that where the term "anneal" is used herein it is used in a broad sense to include not only strictly technical annealing but any other processing procedure which involves heating of the coils. Various types of furnaces may be employed to carry out the heating operation, regenerative furnaces of the general type disclosed in the co-pending Lee Wilson and Paul R. Barenok United States patent application Ser. No. 358,156 being shown and described herein as illustrative of one kind of furnace that may be incorporated in our coil annealing line.

It is an object of the present invention to utilize a plurality of separate heating furnaces in such a manner that coils of strip metal may be charged into and removed therefrom by means of charging equipment which is readily adapted to automated or programmed operation. Other objects of our invention include the provision of coil annealing apparatus which is highly efficient in operation, requires a minimum of floor space for the output produced, and which has relatively low operating costs as compared to previously proposed coil annealing installations. Among the further objects of our invention is the provision of improved coil handling and furnace charging apparatus particularly adapted for use in multiple furnace installations of the type referred to herein.

The above and other objects of our invention will appear from the following description of one embodiment thereof, reference being had to the accompanying drawings in which.

Figure 1A:
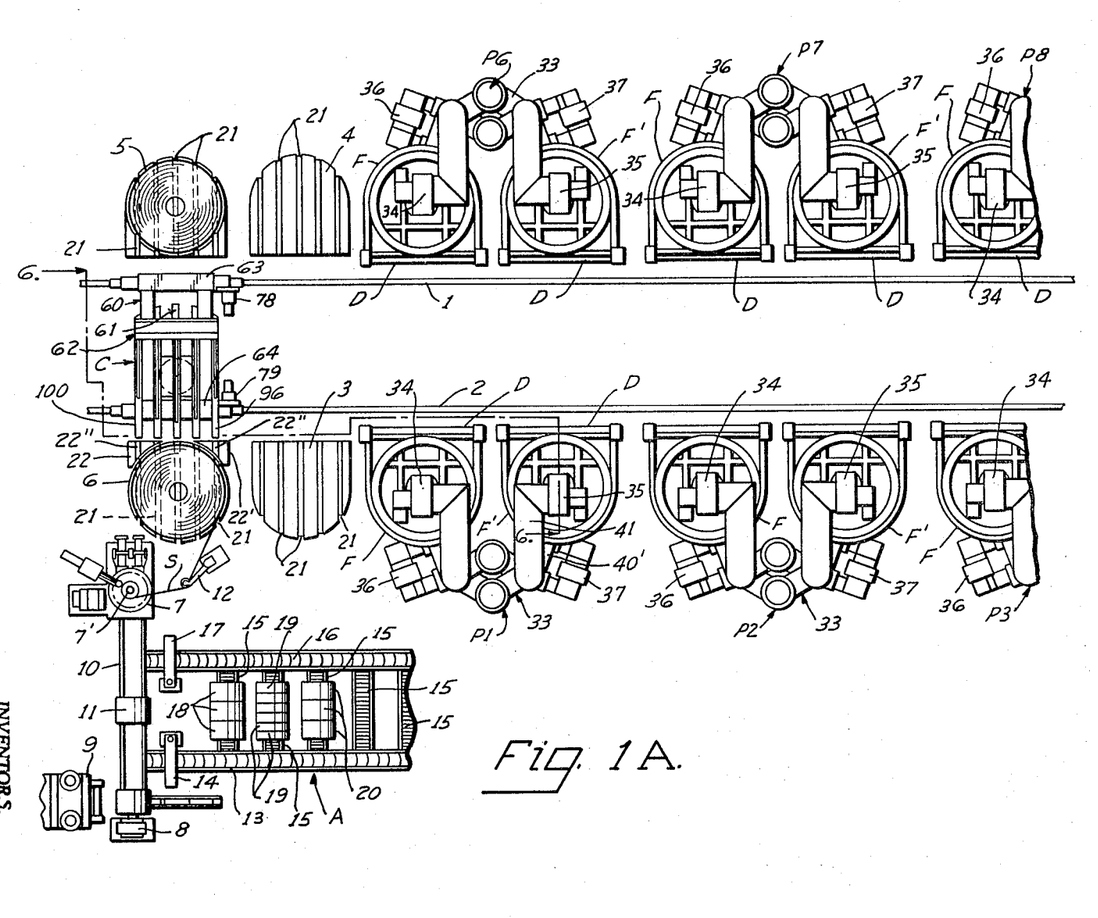
FIGURE 1A is an illustrative plan view showing the coil entering end of a double row multi-furnace annealing line in accordance with the present invention.
Figure 1B:
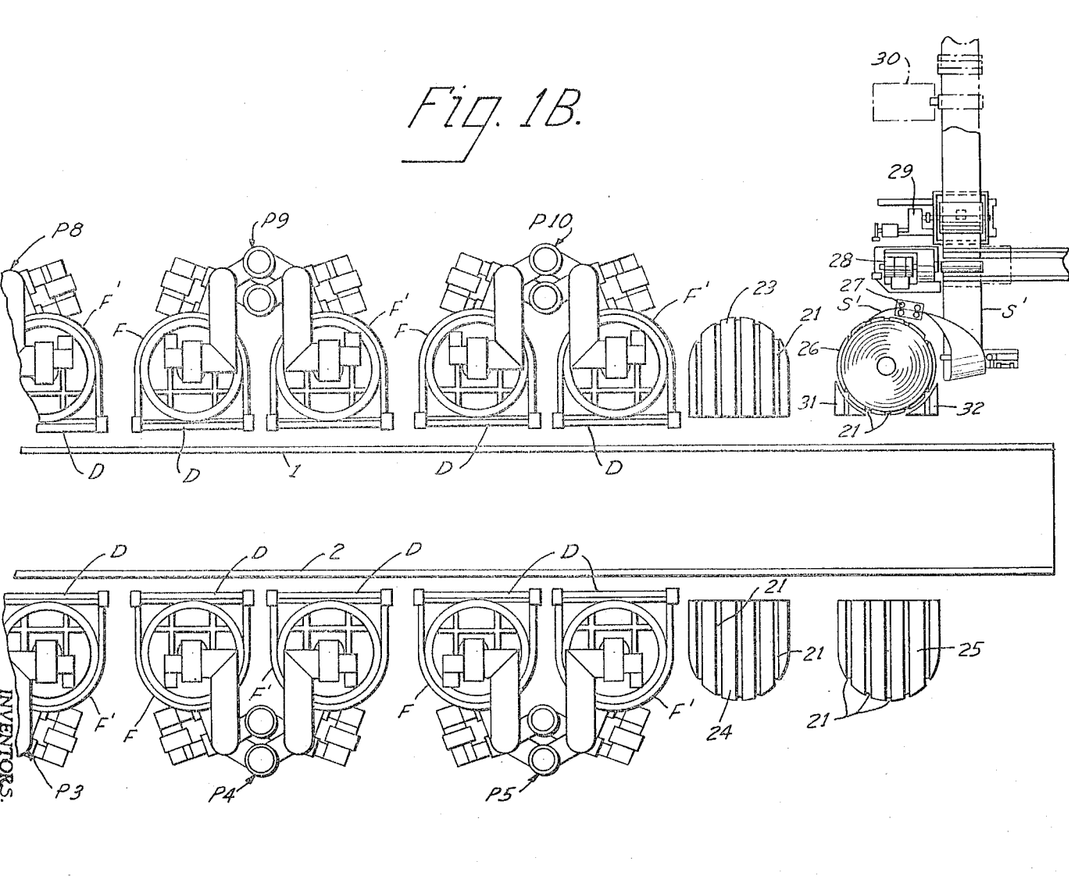
FIGURE 1B is a view showing the continuation of the double row multi-furnace annealing line of FIGURE 1A together with the strip handling apparatus at the discharge end of the line.

Referring now to FIGURES 1A and 1B, the double row, multi-furnace annealing line illustrated therein comprises a plurality of pairs of furnaces arranged in two spaced apart parallel rows with coil charging car supporting tracks extending therebetween. One of the rows of furnaces includes a first pair of furnaces generally indicated at P1, the two furnaces making up the pair being identified by reference numerals F and F', together with similar pairs of furnaces identified by reference characters P2, P3, P4 and P5. Directly opposite the furnaces of the just described first row are additional pairs of furnaces forming a second row, these pairs being identified by reference characters P6, P7, P8, P9 and P10. It will be noted that, as the furnaces of each pair are identical to the furnaces of each other pair, the individual furnaces of the pairs have all been identified by the reference characters F and F'.

Extending lengthwise between the two rows of furnaces are main charging car tracks 1 and 2 which support a coil charging car, generally indicated at C, which, as will be more fully described later, is mounted on wheels for travel back and forth on the tracks 1 and 2 between the two rows of furnaces. At the left hand or entering end of the rows of furnaces as seen in FIGURE 1A are three entry coil storage bases 3, 4 and 5 for temporary storage of coils prior to placing them in the furnaces. Also at the left hand end of the rows of furnaces is a rotatable open coil forming turntable 6 and an adjacent upending type tight coil supporting payoff turntable 7. Tight coils formed on the coiler 8 at the exit end of the strip rolling mill 9 are adapted to be transferred from the coiler 8 to the turntable 7 by conveyor 10, a coil being seen on this conveyor at 11.

The tight coil turntable 7 is so mounted that it may be tilted from the vertical axis position seen in FIGURE 1A into a horizontal axis position in which coils 11 may be moved axially onto the center mandrel 7' of the turntable and the turntable, coil and mandrel then tilted into vertical axis position to up-end the coil into the position seen in FIGURE 1A. The strip S from this coil is led through a suitable tension control device 12 and is formed into an open coil with the laps thereof spaced apart on the open coil turntable, preferably in the manner illustrated and described in the Lee Wilson and Edwin A. Corns United States Patent No. 3,114,539.

In order to increase the flexibility of operation of our improved annealing line, and to permit continued operation of the annealing furnaces during periods in which the rolling mill 9 may be shut down, we provide a coil storage area indicated at A. This comprises a take-off conveyor 13 adapted to receive and move coils away from the conveyor 10, a coil transfer lift 14 for transferring coils from conveyor 10 to conveyor 13, a plurality of transverse storage conveyors 15 which extend between the take-off conveyor 13 and the return conveyor 16, and the return conveyor coil transfer lift 17 which is adapted to transfer coils from conveyor 16 back to conveyor 10. This storage area A is adapted to receive and hold a supply of coils of the same or different strip width and gauge and greatly increases the flexibility of the operation of the entire annealing line by making available, for annealing at any time, coils of different size and type of strip. Such coils are indicated on the transverse storage conveyors 15 at 18, 19 and 20.

The storage area A also permits an adequate supply of coils to be maintained ready for charging the furnaces so that interruptions in the operation of the annealing line at full capacity are eliminated. Furthermore this storage area permits the annealing line to continue in operation during either planned or forced shut down of the rolling mill 9.

The upper surface of the open coil forming turntables 6 and the upper surfaces of the coil storage bases 3, 4 and 5, as well as the coil supporting base plenum structures in each of the furnaces P1, are each provided with a series of parallel slots 21. As will be later described, these slots have tracks on the bottom thereof which are adapted to support the lift bars 114–118 of the coil charging car C.

It will be seen from FIGURES 1A and 1B that the inner ends of the storage tables 3, 4 and 5 and of the base structures of the furnaces F and F' are longitudinally aligned and extend parallel to the tracks 1 and 2. In order to provide support for the charging coil car lift bars 114–118 (see FIGURE 4) auxiliary stationary track carrying tables 22 and 22' are disposed adjacent the open coil forming turntable 6 and are provided with slots 22" which are aligned with the slots 21 of the turntable 6 when the turntable is positioned as seen in FIGURE 1. These auxiliary tables 22 and 23 provide continuous support for the coil lift bars of the charging car C when they are extended into coil receiving position in the slots 21 of the turntable 6.

At the exit or discharge end of the annealing line (right hand as seen in FIGURE 1B) are three additional exit coil storage bases 23, 24 and 25 which are similar to bases 3, 4 and 5 and are provided with lift bar slots 21 which extend normally to the main tracks 1 and 2 in the same manner as do the corresponding slots in storage bases 3, 4 and 5. Also at the exit end of the annealing line is the uncoiling turntable 26 on which annealed coils are placed by the charging car C and from which the annealed strip S' is passed through a vertical strip guide unit 27, twisted from a vertical into a horizontal plane and its direction of travel changed to be approximately normal to the tracks 1 and 2, and then moved either to a recoiler unit 28 for tight coiling or to a tension drum unit 29 preliminary to entry into a temper mill or other processing step as indicated at 30. The recoiling turntable 26 is also provided with lift bar receiving slots 21 and the intermediate lift bar track supporting tables 31 and 32 are similar in structure and function to the auxiliary track supporting tables 22 and 23 adjacent the open coiling turntables 6.

Before describing in detail the charging car C and its mode of operation in handling coils to and from the furnaces, it may be pointed out that this car is movable on the tracks 1 and 2 into coil discharging or receiving position at either of the turntables 6 or 26, at any of the coil storage bases 3, 4, 5, 23, 24 or 25, and at any one of the furnaces F or F'. The charging car C is adapted to pick up a coil from any one of the just referred to stations and move it to and discharge it at any other one of these stations. Accordingly, by suitable scheduling and programming, and by provision of the proper number of furnaces to produce the desired output, one unitized annealing line may be operated in such a manner that annealing of successive coils is completed at closely spaced intervals so that the discharge turntable 26 may be operated substantially continuously, i.e., as soon as one coil has been removed therefrom another coil will be annealed and ready for transfer thereto. During this operation of the line the charging car C will travel back and forth on the tracks 1 and 2, carrying unannealed coils from the open coil turntable 6 or storage bases 3, 4 or 5 to the furnaces as annealed coils are removed therefrom, and transferring annealed coils to the recoiling turntable 26 or the exit storage bases 23, 24, or 25.

Each pair of furnaces P1–P10 comprise two adjacent side by side furnaces F and F'. In any given pair the separate furnaces F and F' are interconnected by suitable pipes and valves, generally indicated at 33, and are provided with blowers 34 and 35 and atmosphere cooling units 36 and 37. These connections permit regenerative heating operation of each pair of furnaces and they are all illustrated and described in detail in said co-pending Wilson and Barenok U.S. patent application Ser. No. 358,156. Each of the furnaces F and F' is also provided with a vertically movable charging door D supported to be lifted and lowered between closed and open positions to permit coils to be charged into and removed from the furnace chambers as desired. It will be noted that each furnace door D faces the charging car supporting tracks 1 and 2 between the parallel rows of pairs of furnaces.

The general arrangement of one of the furances and its door D is seen in FIGURES 6–9 and, as all of the furnaces are substantially identical it will be sufficient to describe only one. The furnace housing or chamber structure 38 is provided with a top central atmosphere inlet opening 39 and a bottom central atmosphere outlet opening 40. A blower 35 discharges into the chamber 38 through atmosphere inlet opening 39, the inlet to the blower 35 being through the recirculating pipe 41. Radiant heating tubes 42, or other suitable heating means, extend radially inwardly into the top portion of the furnace chamber 38 and a baffle member 43 is adapted to direct the atmosphere which enters the furnace through opening 39 radially outwardly where it passes over the heating tubes 42 and is heated thereby. After passing through and over the coil which is supported on the base plenum and coil support structure 44 at the bottom of the furnace chamber and which, as previously noted, is provided with parallel slots 21 similarly arranged and spaced to those of the turntables and storage bases 6, 3, etc., the atmosphere exits through outlet 40 and pipe 40'. This pipe 40' is connected to inlet pipe 41 through the valves 33 so that the furnace atmosphere may be recirculated repeatedly through the furnace chamber 38 of one furnace or regeneratively through the two furnaces of a pair.

The furnace door D is supported for vertical movement on a swingable frame structure 45 which has its upper end pivotally mounted at 46 on a supporting structure 47 on the top of the furnace. The door D is supported by the chain or cable 48 which passes over the sheave 49 mounted in a supporting structure 47 and which extends downwardly to a suitable power driven winch (not shown)) adapted to pull or release the chain 48 and lift or lower the door D.

As seen in FIGURES 6–9 the door D is in its lifted or open position. When it is desired to close the door the chain 48 is released so that the door moves downwardly in a slightly outwardly inclined direction guided by the frame 45 into a position opposite but outwardly spaced from the furnace door opening 50 (see FIGURES 6–9). The lower end of frame 45 is pivotally secured at 51 to a piston rod 52 which in turn is secured to a piston in the fluid pressure cylinder 53 which is supported on the furnace foundation. After the door is lowered into position spaced outwardly from but in alignment with the furnace opening 50 the cylinder 53 is actuated to pull the frame 45 inwardly so that the door D moves into closed position in the furnace opening 50. Suitable resilient seals, preferably tubular as indicated at 54, extend around the door D to effect a tight joint between the door D and the furnace housing 38. To open the door the cylinder 53 is actuated to swing the frame 45 outwardly and the door is then lifted by taking in the chain 48 by the above referred to winch.

FIGURES 2–5 inclusive illustrate the coil charging car C which travels back and forth on the main tracks 1 and 2 between the two rows of furnaces and is adapted to remove the coils from, and position them upon, the slotted base structures of the turntables, storages bases and furnaces that have previously been referred to and described. The car includes a main frame structure 60, an intermediate turntable carriage 61 having wheeled support on the cross tracks 76 and 77 carried by the main frame structure 60, and an upper coil transfer carriage 62 having wheeled support on the transfer tracks 96', 97', 98', 99' and 100' on the intermediate turntable car 61.

The main frame structure 60 includes a rectangular platform having end members of 63 and 64 extending parallel to tracks 1 and 2 and transverse members 65 and 66. As best seen in FIGURE 3, the end members 63 and 64 are of generally inverted channel form and each serves to pivotally support and house wheel carrying yoke members 67 and 68 (see FIGURE 4) on suitable pivots or trunnions 69 and 70. The yoke members 67 and 68 in turn each pivotally support pairs of wheel housings 71 and 72 at the opposite ends of the yokes, these pivotal supports being seen at 73. Each housing 71 and 72 carries on suitable bearings a pair of wheels 74 and 75 and, by reference to FIGURES 2, 3 and 4, it will be observed that each of the end members 63 and 64 of the main frame structure 60 of the car C carries eight wheels which are so mounted that the entire load on the car is evenly distributed therebetween upon the tracks 1 and 2. As the coils which are carried by the charging car C may weigh over 200,000 pounds the wheeled support for the car is important and the above described arrangement provides a rugged, compact and effective structure.

Mounted on the transverse members 65 and 66, and depressed somewhat below the top level thereof, are the intermediate turntable carriage supporting cross tracks 76 and 77 which, as will be later described, support the intermediate turntable carriage 61 for travel on the main frame structure 60 transversely of the path of movement of the car as a unit on the tracks 1 and 2. Main car drive motors 78 and 79 are carried by the main frame structure 60 and have driving connection with the supporting wheels 74 and 75 thereon. These motors are reversible and are effective to drive the car C in either direction on the tracks 1 and 2.

The intermediate turntable carriage 61 is carried on two sets of wheels 84 and 85 which are supported respectively on tracks 76 and 77 on the main frame 60. This intermediate carriage 61 has a base portion comprising a pair of spaced wheel carrying channels 86 and 87 connected by a central box structure 88 (see FIGURE 5). This box structure extends downwardly into an open well formed between the transverse members 65 and 66 of the main frame 60 and carries the intermediate carriage drive motor 89 which has a drive pinion 90 mounted on its shaft and in engagement with the transversely extending rack 91 which is supported on the transverse member 66 of the main frame structure 60 (see FIGS. 3 and 5). Mounted on the top of the box structure 88 of the intermediate carriage 61 is a rotatable coil charging turntable 92 carrying a ring gear 93 on its outer periphery. This ring gear 93 is engaged by the pinion 94 of the turntable drive motor 95 which in turn is mounted on the central box frame structure 88.

Figure 2:
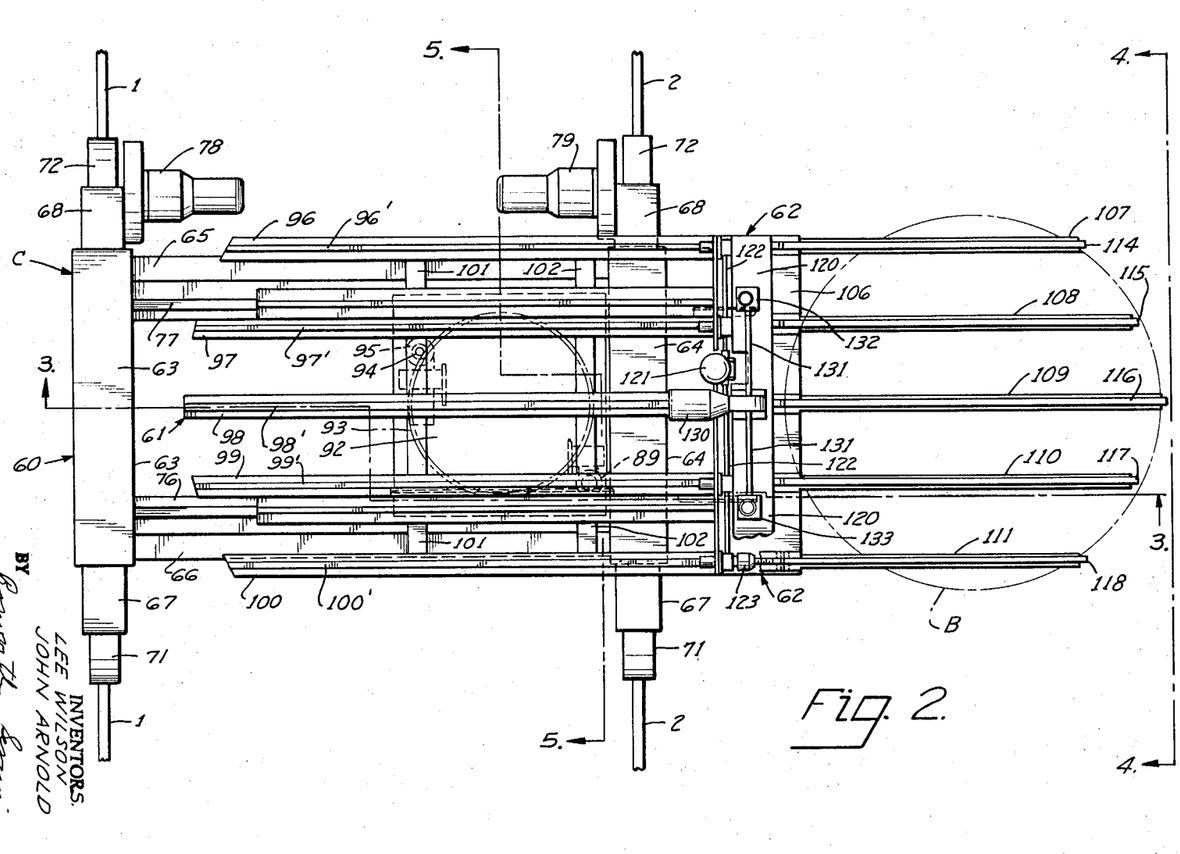
FIGURE 2 is an enlarged plan view of the coil charging car seen in FIGURES 1A and 1B, the several elements or sections of the car being shown in their fully advanced or extended positions.
Figure 3:
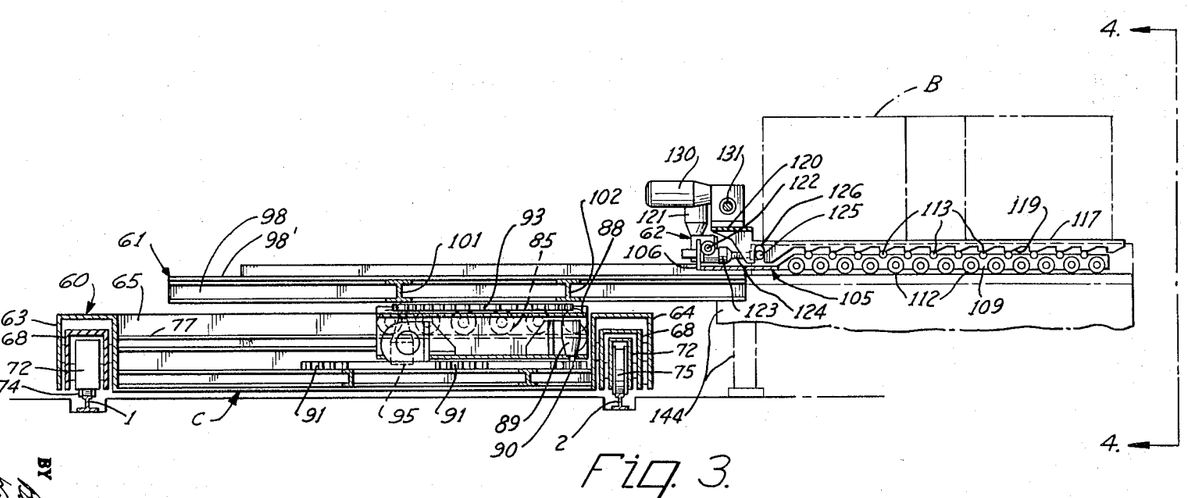
FIGURE 3 is a side elevational view of the coil handling car seen in FIGURE 2.

Secured to and supported on top of the turntable 92 is a platform structure made up of five parallel transfer car tracks supporting beams 96, 97, 98, 99 and 100 and transverse interconnecting beams 101 and 102 (see FIGURE 2). Transfer tracks 96', 97', 98', 99' and 100' are mounted on each of the beams 96–100 and, when the intermediate turntable carriage 61 is in coil loading or unloading position as seen in the several views of the drawings, extended in a direction normal to the direction of travel of the car C on the tracks 1 and 2. The right hand ends of the beams 96–100, as best seen in FIGURE 2, all lie on a line parallel to the tracks 1 and 2 while the opposite or rear ends of these beams are cut back to permit free rotation of the turntable and the platform structure supported thereon when in their centered positions on the base structure 60.

The upper coil transfer carriage 62 comprises a wheeled frame 105 made up of a transverse portion 106 and inverted channel shaped finger members 107, 108, 109, 110 and 111 (see FIGURES 2 and 3). Each of these finger members supports a plurality of flanged wheels 112 which in turn are supported on the transfer tracks 96', 97', 98', 99' and 100' on the intermediate carriage. When the transfer carriage is extended to deposit or pick up a coil these wheels also engage and are supported on the tracks in the bottom of the slots 21 in the turntables 6 and 23, the storage bases 3, 4, 5, 23, 24 and 25, and the corresponding slots (not seen in the drawings) in the furnace base plenum structures 44.

Figure 4:
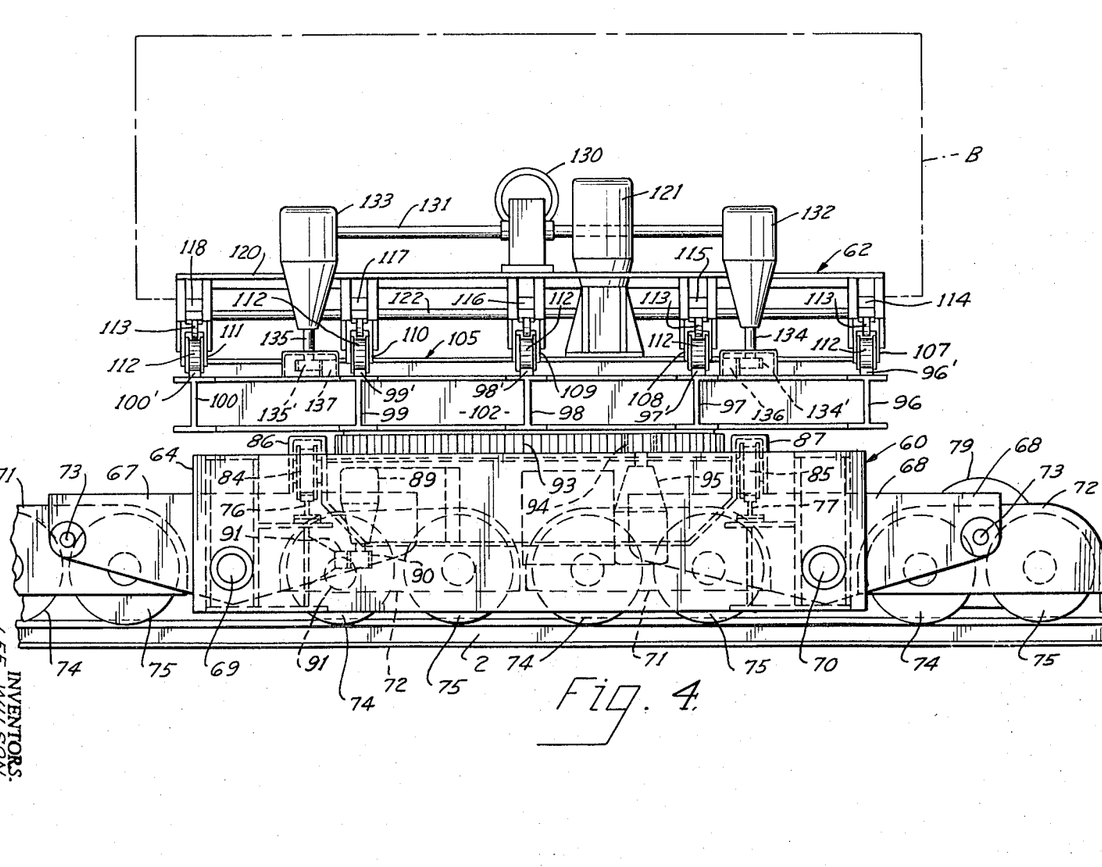
FIGURE 4 is a somewhat enlarged end elevational view of the coil handling car seen in FIGURES 2 and 3, taken substantially on line 4—4 of FIGURES 2 and 3.

Each of the finger members 107–111 of the transfer carriage 62 also supports a plurality of cam rollers 113 which are rotatably mounted above and between the wheels 112 as is best seen in FIGURES 3 and 4. The tops of these rollers are disposed above the tops of the fingers 107–111 and are adapted to engage and support the five coil lift bars 114, 115, 116, 117 and 118. Each of these lift bars is notched or serrated on its underside as seen in FIGURE 3 to provide a plurality of inclined cam faces 119 which are adapted to engage and co-act with the cam rollers 113 in the lifting and lowering of the lift bars 114–118 as will be more fully explained later.

These lift bars 114–117 are connected together only at their inner ends (left hand as seen in FIGURES 2 and 3) by an interconnecting plate structure 120 so that, in effect, the lift bars 114–118 and the plate structure 120 form an integral unitary fork structure supported on the cam rollers 113.

Mounted on the transverse base portion 106 of the wheeled frame structure 105 of the transfer carriage 62 is a vertical axis electric drive motor 121 which is connected through suitable gearing to drive a transverse shaft 122. Supported along this shaft 122 on the base portion 106 are a plurality of screw jack units 123 (see FIGS. 2 and 3). These screw jack units have threaded screw members 124 which, when the motor 121 is operated, are advanced or retracted relative the frame structure 105. At the ends of the screws 124 are rollers 125 which are disposed in vertical slots 126 formed in the inner end portions of the lift bars 114–118.

As the upper fork structure or lift bar assembly of the transfer carriage 62 is supported on the rollers or cam members 113 and is free to move thereon relative to the wheeled base frame structure 105 of the transfer carriage 62, it will be seen that, when the motor 121 is actuated to cause the screw 124 to move the roller 125 to the left (as seen in FIGURE 3) relative to the base frame structure 105, movement will necessarily take place between the base frame structure 105 and the lift bar assembly or fork structures 114–118. As will be more fully described later this movement will cause the lift bars 114–118 to be raised or lowered between upper coil supporting and lower coil discharging positions and will enable a coil which is supported thereon to be positioned on or removed from the slotted coil support structure of the turntables, storage bases or furnaces.

Figure 5:
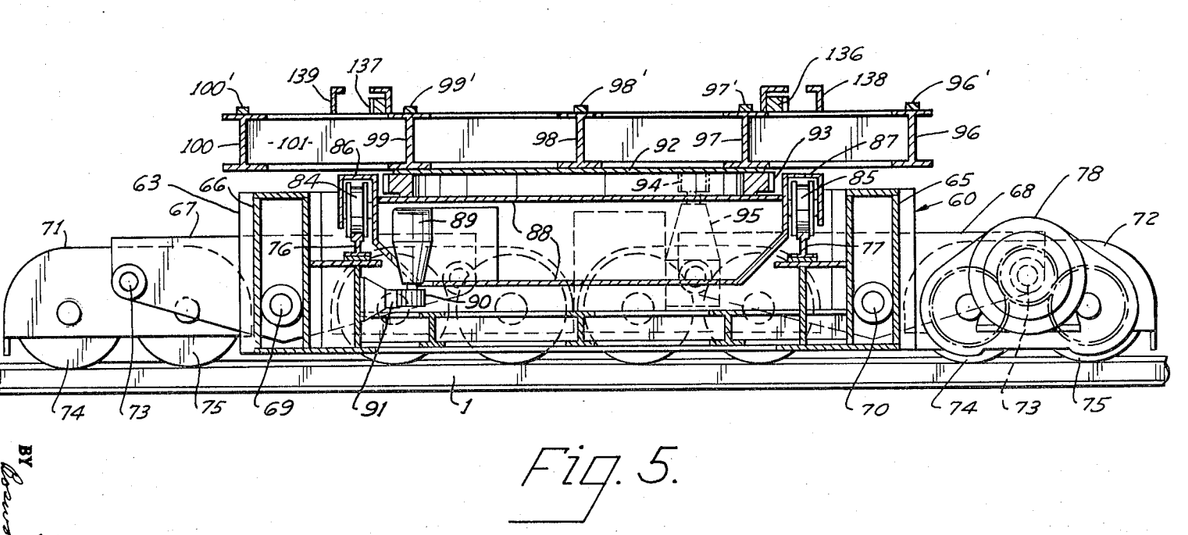
FIGURE 5 is a cross sectional view to the same scale as FIGURE 4 and taken substantially on line 5—5 of FIGURE 2.

In order to effect movement of the coil transfer carriage 62 on the transfer tracks 96', 97', 98', 99' and 100' between the advanced or extended position seen in FIGURE 3 and the withdrawn or retracted position seen in FIGURE 1A, a drive motor 130 is mounted on the lift bar interconnecting plate 120 and connected through suitable gearing to drive a transverse shaft 131. As best seen in FIGURE 4, this shaft 131 extends to gear boxes 132 and 133 from which vertical shafts 134 and 135 extend downwardly. The gear connections from shaft 131 to shafts 134 and 135 preferably are irreversible so that fork structure 114–118 cannot move longitudinally relative to the intermediate carriage 61 except by operation of motor 130. These shafts carry pinions 134' and 135' which mesh with longitudinally extending racks 136 and 137 which, as best seen in FIGURES 4 and 5, are mounted on the upper platform structure of the intermediate turntable carriage 61 alongside of the supporting beams 97 and 99 respectively. Slotted protective housings 138 and 139 are provided for the racks 136 and 137 and it will be understood that when the motor 121 is driven to rotate the pinions 134' and 135' the upper coil transfer carriage 62 will be moved on its supporting tracks on the intermediate turntable carriage 61 between a fully extended position as seen in FIGURE 3 and a fully retracted position as seen in FIGURE 1A.

As previously noted, the charging car C is illustrated in FIGURES 2–5 inclusive in its fully extended position. In order to return the car elements to their retracted or centered positions as seen in FIGURE 1A the drive motor 130 of the upper coil transfer carriage 62 is operated to drive the pinions 134' and 135' in a direction such that their engagement with the racks 136 and 137 on the intermediate turntable carriage 61 will cause carriage 62 to move to the left. This movement is continued until the lift bars 114–118 are centered above the turntable 92. Subsequently to this movement of the upper coil transfer carriage 62 the intermediate turntable carriage 61 is moved to the left (FIGURES 2 and 3) by operating the intermediate carriage drive motor 89 in a direction such that the engagement of the pinion 90 with the rack 91 on the main frame structure 60 will cause the intermediate carriage 61, together with the upper transfer carriage 62, to move to the left. This movement is continued until the turntable 92 is centered between the tracks 1 and 2 whereupon the elements or parts of the charging car C will be in their centered positions and the car may be traversed on the tracks 1 and 2 to any one of its several stations at the turntables, storage bases, or furnaces.

Figure 9:
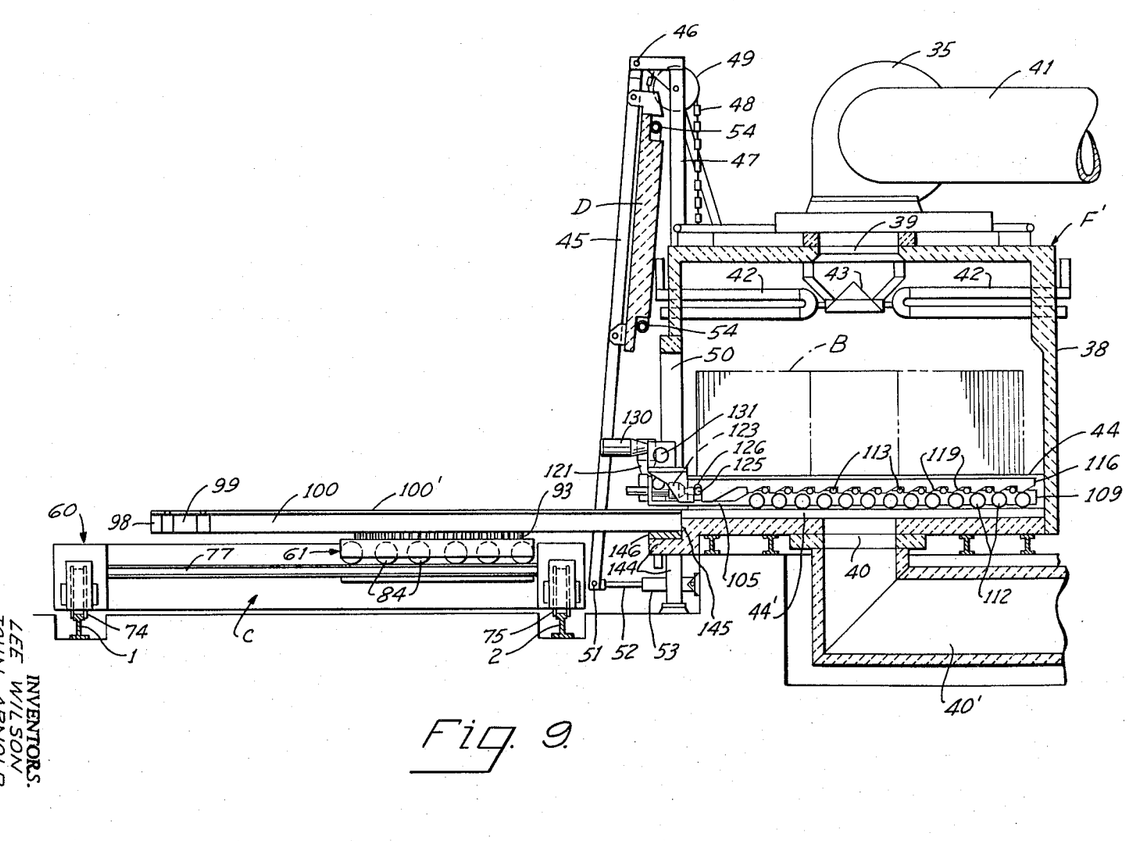
FIGURE 9 is a vertical cross sectional view similar to FIGURE 8 but showing the upper coil transfer carriage lift bars in their lowered positions with their upper surfaces below the coil supporting surface of the furnace base plenum.

As seen in FIGURE 1A the car C is illustrated with the upper coil transfer car 62 in retracted position but with the intermediate turntable car 61 in fully advanced position with the ends of beams 96–100, and the tracks carried thereby, adjacent to and aligned with the corresponding tracks in the slots 22" in the auxiliary tables 22 and 22'. The open coiling turntable 6 has been stopped with its slots 21 aligned with the slots 22" in the tables 22 and 22' and with the beams 96–100 of the car C. As the turntable 6 and in the auxiliary tables 22 and 22' carry tracks which are now aligned with and form continuations of the tracks 96', 97', 98', 99' and 100' on the beams 96–100, the upper coil transfer carriage 62 may be moved outwardly on these tracks until the lift bars 114–118 thereof lie within the slots 21 of the turntable 6 below the bottom face of a coil which is supported thereon. Such extension of the coil transfer car 62 must, of course, be effected with the lift bars 114–118 in their lowered positions so that the tops of the bars will be below the coil supporting surface of the turntable 6. Such a lowered position of the lift bars is seen in FIGURE 9.

To lift a coil from the open coiling turntable 6 the fork unit made up of the lift bars 114–118 and their interconnecting plate 120 are locked against longitudinal movement relative to the intermediate turntable carriage 61. This may be effected by braking the motor 130 to prevent rotation of the shaft 131 and the pinions 134' and 135', thereby locking the lift bars 114–118 and the interconnecting plate 120 against longitudinal movement relative to the beams 96–100 of the intermediate turntable car 61. Next the drive motor 121, which is carried by the base frame portion 105 of transfer carriage 62 is operated to effect extension or elongation of the screws 124 of the jack screw mechanism 123. As the screws 124 and rollers 125 mounted thereon are secured against longitudinal movement relative to the lift bars 114–118 by engagement in the slots 126, such extension will cause the base frame structure 105 of the coil transfer carriage 62 to move to the left into the position seen in FIGURE 3. During such movement, as the lift bars 114–118 are locked against longitudinal movement, these bars will be raised by engagement of the rollers 113 with the inclined cam surfaces 119 on the lift bars. The elevation of the upper surface of the lift bars effected by this operation is sufficient to raise the lift bars above the surface of the turntable 6, thus lifting the coil therefrom until it is clear of the turntable and supported only on the lift bars.

It will be noted from FIGURE 4 that the racks 136 and 137 have a greater vertical height than the sprockets 134' and 135'. This permits these sprockets to be lifted and lowered with the lifting and lowering movements of the lift bars 114–118 while still maintaining their driving engagement with the racks.

After a coil has been thus lifted from the turntable 6 the motor 130 is actuated to effect retraction of the coil transfer carriage 62 back to a position where the coil is centered over the turntable 92 on the intermediate carriage 61. During this retracting movement of the transfer carriage and coil supported thereon the intermediate carriage 61 remains in its advanced position (see FIGURE 3) with the aligned right hand ends of the beams 96–100 engaging and supported by a suitable stationary abutment or support 144 mounted on the mill foundation. By this arrangement the weight of the coil and the transfer carriage 62 are directly supported on the foundation until the coil is withdrawn into its centered position relative to the turntable 92. As this turntable is always disposed between the tracks 1 and 2 any possibility of overturning or derailing the car C is eliminated.

After the upper transfer carriage 62 and the coil thereon are so retracted the intermediate carriage drive motor 89 is operated to rotate the pinion 90 in a direction to move the intermediate carriage 61 to the left until the turntable 92 is centered between the tracks 1 and 2. At this time the coil will also be centered and its load evenly distributed on both tracks and the squared off ends of beams 96–100 will extend parallel and adjacent to track 2 (see FIGURE 6).

With the coil so positioned the car C may be moved on the tracks 1 and 2 into position before any of the furnaces or storage bases or into alignment with the recoiling turntable 26. If it is desired to transfer the coil to one of the furnaces or storage tables which face or are adjacent to track 1 or to the recoiling turntable 26, as distinguished from those that face or are adjacent to track 2, the turntable drive motor 95 is operated to rotate the pinion 94 and thus drive the turntable ring gear 93 and rotate the turntable, together with the platform supported thereby and the upper transfer carriage 62 and coil, through 180° so that the squared off ends of the beams 96–100 of the intermediate carriage 61 are adjacent and extend parallel to track 1. Abutments or supports similar to 144 are provided at each turntable, storage base and furnace and the coil lifting operation just described may be carried out at any of the furnaces, storage bases of turntables. The operation of the car C to charge a coil into a furnace will be described later with reference to FIGURES 6–9.

From the above description of the operation of the charging car C to lift a coil from a supporting base it will be observed that by means of a single such car coils may be moved to and from all of the slotted bases which are included in the annealing line and, as soon as an annealing operation in a furnace is completed, the annealed coil may be transferred to the recoiling turntable 26 or to one of the exit storage bases 23, 24 or 25 and an unannealed coil immediately transferred to the furnace from either the open coiling turntable 6 or one of the entry and storage bases 3, 4 or 5.

By suitable timing and control mechanisms the annealing cycles of the several furnaces may be so regulated and scheduled relative to one another that completely annealed coils will be produced at regular intervals. By means of the car C these coils may be promptly removed from the furnaces and unannealed coils immediately charged thereunto thus effecting maximum output.

FIGURES 6, 7, 8 and 9 are vertical cross sectional views taken generally on line 6—6 of FIGURE 1A, the charging car C being shown indexed and locked by suitable means, not shown, in coil charging position in front of the furnace F' of the pair P1 of the row of furnaces which face and are adjacent to track 2 of the charging car supporting tracks. For clarity of illustration, the furnace F' is shown in vertical cross section while the car C is illustrated in elevation.

Figure 6:
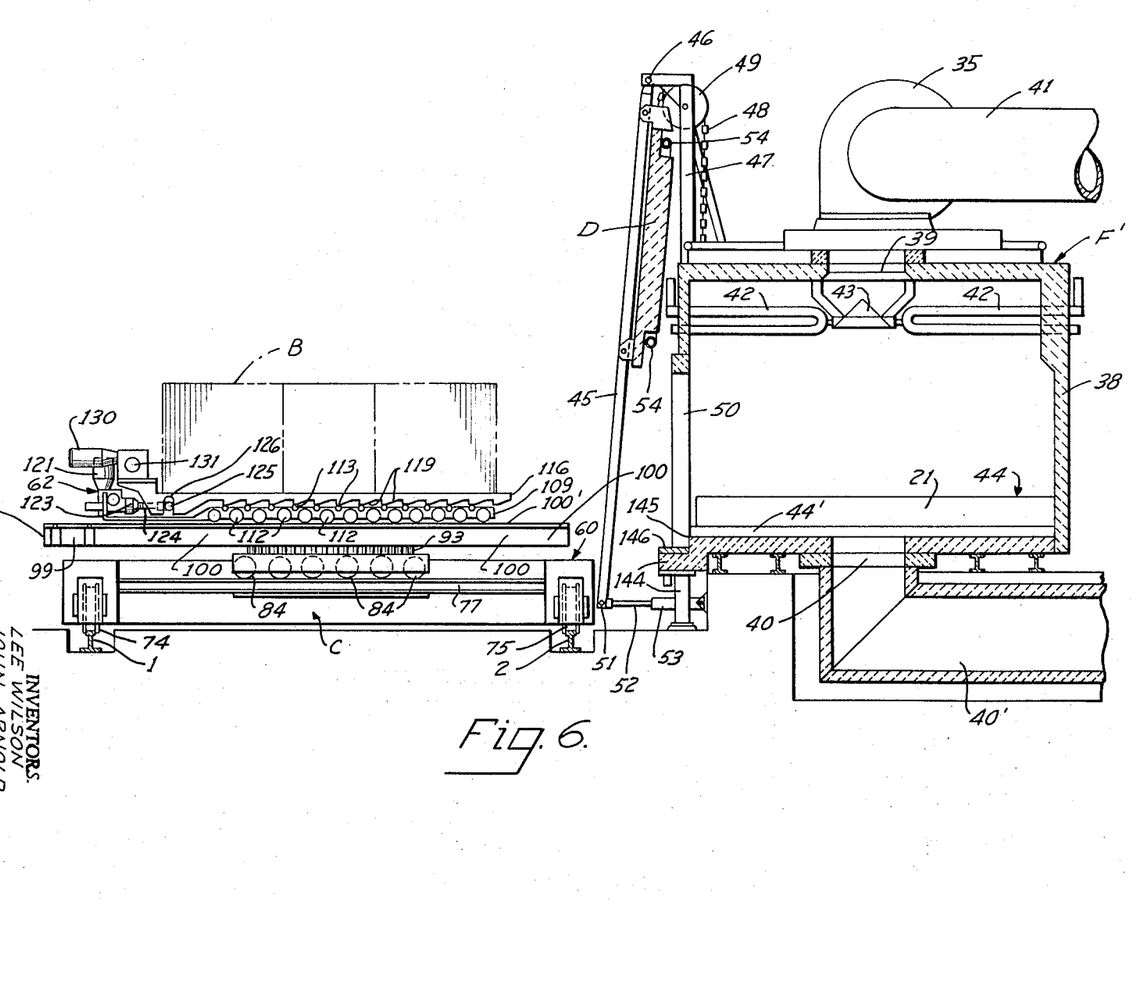
FIGURE 6 is a vertical cross sectional view taken substantially on line 6—6 of FIGURE 1A, the coil charging car being seen in its centered or retracted position and being aligned with one of the heating furnaces.

As seen in FIGURE 6 the car C is in its centered or fully retracted position with the intermediate turntable carriage 61 centered between the tracks 1 and 2, the turntable 93 positioned so that the squared off ends of the beams 96–100 face the furnace F' and lie on a line adjacent and parallel to the track 2. The upper coil transfer carriage 62 is also positioned on the beams 96–100 of the intermediate carriage 61 so that the central axis of the open coil B (which is shown in phantom lines supported on the lift bars 114–118) is centered above and substantially coaxial with the turntable 92 and its driving rack 93 on the intermediate carriage 61.

Figure 7:
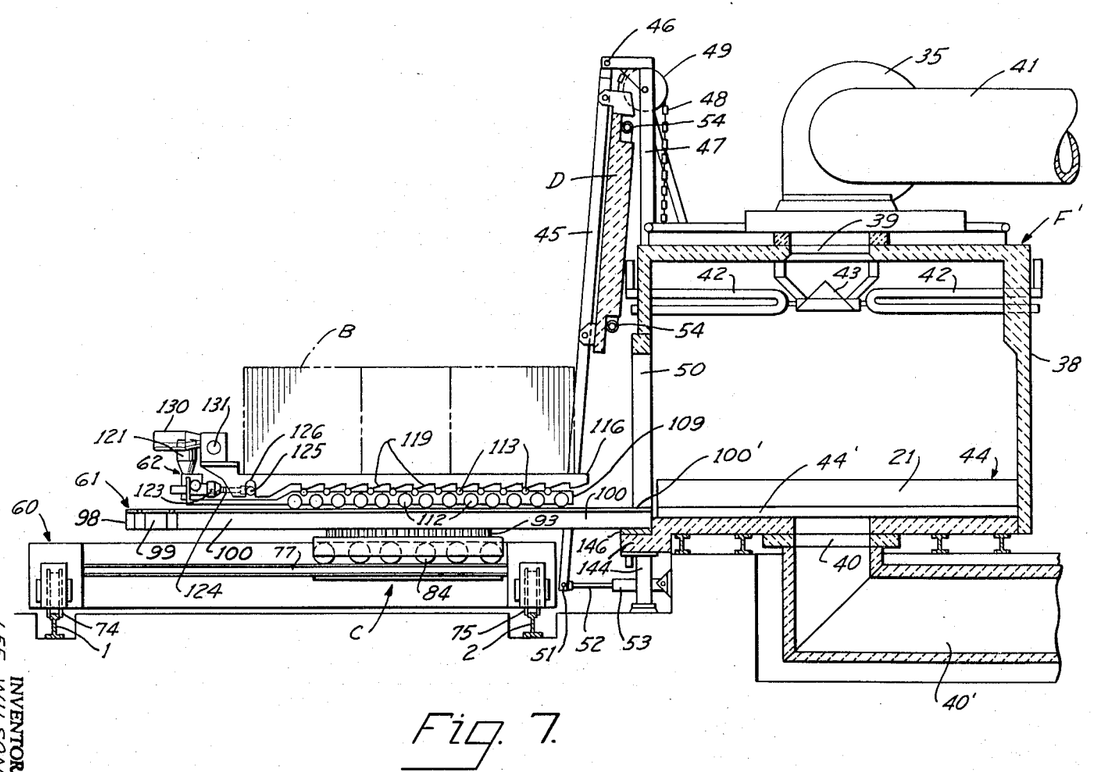
FIGURE 7 is a view similar to FIGURE 6 but illustrating the charging car with the intermediate turntable carriage thereof advanced into supported engagement with the adjacent furnace structure.

To charge the coil B into the furnace chamber 38 the intermediate carriage drive motor 89 is operated to move the carriage to the right (FIGURE 6) on tracks 76 and 77 until the squared off ends of the beams 96–100 engage the end face 145 of the stationary abutment 144 which, as previously noted, is supported on the mill floor and extends across the front of the furnace F'. This abutment is also preferably provided with a top ware plate 146 which, as clearly seen in FIGURE 7, engages and supports the undersides of the beams 96–100. When the intermediate carriage 61 has been moved into this advanced position the elements of the car C will appear as seen in FIGURE 7 and it will be observed that the tracks 96'–100' on the beams 96–100 are aligned with the tracks 44' which are supported in the bottom of the slots 21 in the coil support and plenum 44, these slots and tracks being spaced apart the same distance as the beams 96–100 and tracks 96'–100'.

Figure 8:
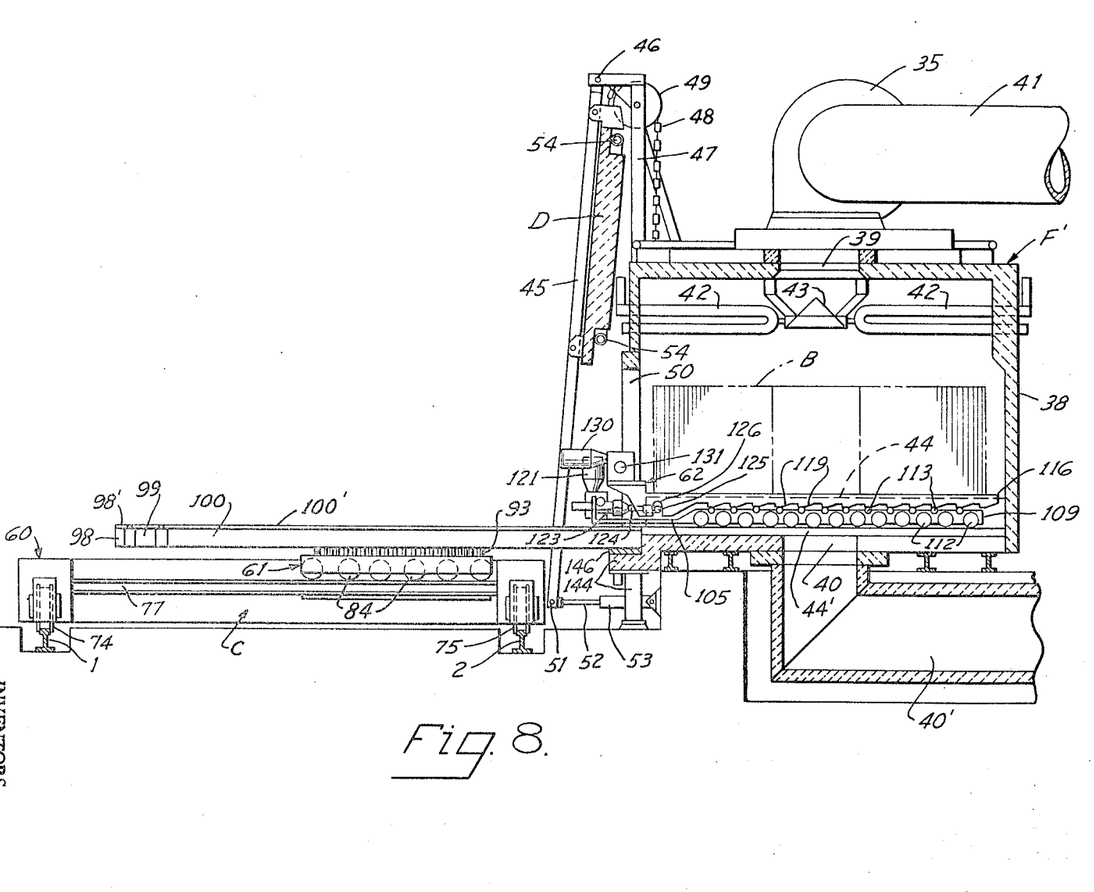
FIGURE 8 is a view similar to FIGURE 7 but illustrating the charging car with the upper coil transfer carriage fully advanced into the furnace, the transfer carriage lift bars being illustrated in their raised positions with their top surfaces above the coil supporting face of the furnace base plenum structure.

Next, the coil transfer carriage drive motor 130 is operated to rotate the pinions 134' and 135' thus causing, through their engagement with the racks 136 and 137, the transfer carriage 62 and coil B to move as a unit into the position in the furnace chamber 38 seen in FIGURE 8. This movement is possible because the tops of the lift bars 114–118 are elevated above the top surface of the plenum and coil support 44 and the lift bars 114–118 will project into the slots 21 in the plenum 44 while the coil B will be supported thereabove as seen in FIGURE 8.

The lift bar assembly of the coil transfer carriage 62 (which comprises the lift bars 114–118 and the interconnecting plate structure 120 together with the motor 130 and the drive means and sprockets 134' and 135') is now locked against longitudinal movement relative to the intermediate carriage 61 while limited vertical movement of the assembly is still permitted as has been previously explained.

In order to lower the lift bars 114–118 until their upper surfaces are disposed below the top surface of the furnace coil support and plenum 44 the screw jack operating motor 121, which is supported on the wheeled frame portion 105, is operated to cause the screws 124 to be drawn into the housings of the screw jacks 123. The result of this operation of the screw jacks is to move the wheeled frame 105 to the right (as seen in FIGURE 8) on the tracks 44' into the position seen in FIGURE 9. As the lift bars 114–118 are at this time locked against longitudinal movement, this movement of the wheeled frame 105 will cause the supporting rollers 113 to travel over the inclined faces 119 on the lift bars 114–118 thus permitting the lift bars, and the coil B supported thereon, to move downwardly vertically under the influence of gravity.

The coil B will come to rest upon the top surface of the furnace coil support and plenum 44 while the tops of the lift bars 114–118 will continue to move downwardly to a position below the level of the top of the coil support and plenum 44. This position is seen in FIGURE 9 and it will be apparent that, by now releasing the anchoring means which holds the lift bar assembly against longitudinal movement and operating the drive motor 130, the entire upper coil transfer carriage 62 will be moved to the left on its supporting tracks 96'–100' back into the position seen in FIGURE 7, the coil B of course remaining in the furnace.

Next, the intermediate carriage 62 is retracted by actuation of motor 89 until it is centered on the main frame structure 60 and the parts of car C are now again in their fully retracted or centered positions as seen in FIGURE 6.

The furnace door D may now be closed and the annealing cycle started. The car C is available for traverse on the tracks 1 and 2 to any of its stations therealong and is available for transferring coils as required. To pick up a coil on the lift bars 114–118 the above described cycle of operations is carried out in reverse order. As previously pointed out, when it is desired to transfer coils to or from the furnaces in the row made up of the pairs P6–P10 the turntable 92 of the intermediate carriage 61 is first actuated, while the car is in the centered position of FIGURE 6, to rotate the supporting beams 96–100 throught 180° from the positions seen in FIGURE 6. This rotation positions the squared off ends of these beams adjacent and parallel to the track 1 and in position to be moved onto the supporting abutments 144 for this row of furnaces, the storage bases 4, 5 and 23, and the recoiling turntable 26. The single charging car C performs all of the coil handling operations for the entire annealing line, eliminating the need for hoists, magnets or other coil moving apparatus and making possible a high degree of prescheduled or automated operation of the entire line by suitable control mechanisms.

Although we have illustrated and described one embodiment of our improved coil annealing apparatus in considerable detail it will be understood that variations and modifications may be made in the form and arrangement of the several parts or elements thereof without departing from the spirit of our invention. We do not, therefore wish to be limited to the particular structures and mechanisms herein shown and described but claim as our invention all embodiments thereof coming within the scope of the appended claims.

We claim:

1. Apparatus for heat treating coils of strip metal including, a row of coil heating furnaces each having a coil support structure having a plurality of spaced parallel slots therein extending transversely of the length of said row of furnaces; charging car main tracks extending longitudinally of said row; an open coil forming turntable disposed adjacent one end of said row and having a coil supporting surface having spaced parallel slots therein; a coil recoiling turntable disposed at the opposite end of said row of furnaces and having a coil supporting surface having spaced parallel slots therein; and a coil charging car supported on said tracks for movement longitudinally in said row of furnaces, said charging car including a main frame structure having wheels supported for travel on said charging car tracks, means for moving said main frame structure on said charging car tracks, cross tracks on said main frame extending transversely of said charging car tracks, an intermediate turntable carriage structure having wheels which are supported on said cross tracks of said main frame structure for movement transversely of said row of furnaces, said intermediate turntable carriage structure including a turntable rotatably supported thereon and having a plurality of coil transfer carriage supporting tracks carried thereby, means for moving said intermediate turntable carriage structure with its turntable and coil transfer carriage supporting tracks on said cross tracks of said main frame structure, means for rotating said turntable and transfer carriage supporting tracks carried thereby through at least 180°, and an upper coil transfer carriage structure having wheels supported for movement on said coil transfer car supporting tracks, said upper coil transfer carriage including a plurality of spaced parallel coil supporting lift bars, means for moving said coil transfer carriage on said coil transfer carirage supporting tracks between extended and retracted positions on said intermediate carriage structure, and means carried by said upper coil transfer carriage structure for lifting and lowering said coil supporting lift bars whereby coils may be lifted from and lowered onto said coil forming and recoiling turntables and said furnace coil support structures; said coil supporting lift bars being spaced apart the same distance as said spaced parallel slots in said furnace coil support structures and said coil forming and recoiling turntables whereby coils may be placed thereon and removed therefrom by said coil transfer car.

2. Apparatus for heat treating coils of strip metal as defined in claim 1 including a second row of coil heating furnaces extending along said charging car main tracks on the opposite side thereof from and parrallel to said row of furnaces referred to in claim 1.

3. Apparatus for heat treating coils of strip metal as defined in claim 1 including a coil storage base having a coil supporting surface having spaced parallel slots therein and disposed at said one end of said row of furnaces adjacent said open coil forming turntable in position to receive coils from said coil charging car.

4. Apparatus for heat treating coils of strip metal as defined in claim 3 including another coil storage base having a coil supporting surface having spaced parallel slots therein and disposed at said opposite end of said row of furnaces adjacent said coil recoiling turntable in position to receive coils from said coil charging car.

5. Apparatus for heat treating coils of strip metal as defined in claim 1 including a coil storage base having a coil supporting surface having spaced parallel slots therein and disposed at said opposite end of said row of furnaces adjacent said coil recoiling turntable in position to receive coils from said coil charging car.

6. Apparatus for heat treating coils of strip metal including, a row of coil heating furnaces each having a coil support structure; charging car main tracks extending longitudinally of said row; and a coil charging car supported on said tracks for movement longitudinally of said row of furnaces, said charging car including a main frame structure having wheels supported for travel on said charging car tracks, means for moving said main frame structure on said charging car tracks, an intermediate turntable carriage structure supported on said main frame structure for movement thereon transversely of said row of furnaces, said intermediate turntable carriage structure including a turntable rotatably supported thereon and having a plurality of coil transfer carriage supporting tracks carried thereby, means for moving said intermediate turntable carriage structure with its turntable and coil transfer carriage supporting tracks on said main frame structure, means for rotating said turntable and transfer carriage supporting tracks carried thereby through at least 180°, and an upper coil transfer carriage structure supported for movement on said coil transfer car supporting tracks, said upper coil transfer carriage including a plurality of spaced parallel coil supporting lift bars, means for moving said coil transfer carriage on said coil transfer carriage supporting tracks between extended and retracted positions on said intermediate carriage structure, and means for lifting and lowering said coil supporting lift bars whereby coils may be lifted from and lowered onto said furnace coil support structures.

7. Coil handling apparatus comprising a main frame structure supported on main tracks for movement therealong and carrying cross tracks extending transversely of said main tracks, an intermediate carriage structure supported on said cross tracks for movement therealong and including a turntable having transfer tracks supported thereon, a coil transfer carriage supported on said transfer tracks for movement therealong in a direction transverse to said main tracks, a plurality of parallel spaced coil supporting lift bars on said coil transfer carriage, means for lifting and lowering said lift bars between upper coil supporting and lower coil discharging positions, and means for rotating said turntable on said intermediate carriage structure whereby said transfer tracks and the coil transfer carriage supported thereon may be turned through at least 180°.

8. Coil handling apparatus as described in claim 7 in which said coil transfer carriage includes a wheeled frame having a plurality of cam members and is supported on said transfer tracks, said lift bars being connected to form a fork structure having a plurality of co-acting cam surfaces engaging said cam members of said wheeled frame, means for effecting relative longitudinal movement between said wheeled frame and said fork structure, and means for blocking said fork structure against longitudinal movement relative to said intermediate carriage while permitting limited vertical movement thereof, said cam members of said wheeled frame being adpated to engage said cam surfaces of said fork structure and lift same vertically upwardly when said fork structure is blocked against longitudinal movement relative to said intermediate carriage and said wheeled frame is moved in one direction relative thereto and to permit said fork structure to move vertically downwardly when said wheeled frame is moved in the opposite direction relative thereto.

9. Coil handling apparatus as described in claim 8 in which said means for effecting relative longitudinal movement between said wheeled frame and said fork structure includes a movable screw member extending between and interconnecting said wheeled frame and fork structure and means carried by said wheeled frame for varying the effective length of said screw member.

10. Coil handling apparatus as defined in claim 8 in which said means for blocking said fork structure against longitudinal movement relative to said intermediate carriage comprises a drive motor on said fork structure, a rack on said intermediate carriage, a pinion carried by said fork structure and engaging said rack, and driving connections, including irreversible gearing, between said drive motor and said pinion.

11. Coil handling apparatus as defined in claim 9 in which said means for blocking said fork structure against longitudinal movement relative to said intermediate carriage comprises a drive motor on said fork structure, a rack on said intermediate carriage, a pinion carried by said fork structure and engaging said rack, and driving connections, including irreversible gearing, between said drive motor and said pinion.

References Cited

UNITED STATES PATENTS

| | | | |
|---|---|---|---|
| 812,364 | 2/1906 | Ramage | 214—26 |
| 1,114,167 | 6/1915 | Carpenter | 214—26 |
| 1,460,323 | 6/1923 | Hodges | 214—26 |
| 1,663,370 | 3/1928 | Edwards | 214—26 |
| 1,761,996 | 6/1930 | Stevenson | 214—26 |
| 1,975,855 | 10/1934 | McBee | 214—26X |
| 1,984,032 | 12/1934 | Reilly et al. | 214—26 |
| 2,028,038 | 1/1936 | Ball | 214—26 |
| 2,168,527 | 8/1939 | Iversen | 214—26 |
| 3,309,073 | 3/1967 | Guingand | 266—5 |

J. SPENCER OVERHOLSER, *Primary Examiner.*

R. S. ANNEAR, *Assistant Examiner.*